United States Patent
Weimer

(10) Patent No.: US 10,496,433 B2
(45) Date of Patent: Dec. 3, 2019

(54) MODIFICATION OF CONTEXT SAVING FUNCTIONS

(71) Applicant: Red Hat, Inc., Raleigh, NC (US)

(72) Inventor: Florian Weimer, Stuttgart (DE)

(73) Assignee: Red Hat, Inc., Raleigh, NC (US)

(*) Notice: Subject to any disclaimer, the term of this patent is extended or adjusted under 35 U.S.C. 154(b) by 6 days.

(21) Appl. No.: 14/552,394

(22) Filed: Nov. 24, 2014

(65) Prior Publication Data

US 2016/0147559 A1    May 26, 2016

(51) Int. Cl.
*G06F 9/46* (2006.01)
*G06F 8/76* (2018.01)
*G06F 11/34* (2006.01)
*G06F 9/54* (2006.01)

(52) U.S. Cl.
CPC .............. *G06F 9/461* (2013.01); *G06F 8/76* (2013.01); *G06F 9/547* (2013.01); *G06F 11/3466* (2013.01)

(58) Field of Classification Search
CPC .............. G06F 9/3004; G06F 9/30054; G06F 9/30087; G06F 9/3842; G06F 9/4425; G06F 8/76; G06F 11/3466; G06F 11/3636; G06F 11/3644; G06F 11/3664; G06F 9/3009; G06F 9/3851; G06F 9/453; G06F 9/461; G06F 9/547
USPC ......................................................... 717/151
See application file for complete search history.

(56) References Cited

U.S. PATENT DOCUMENTS

| | | | |
|---|---|---|---|
| 5,201,039 A | 4/1993 | Sakamura | |
| 6,941,549 B1 | 9/2005 | Holder et al. | |
| 7,137,105 B2 * | 11/2006 | Madsen et al. | G06F 11/3466 717/128 |
| 8,191,085 B2 | 5/2012 | Moyer | |
| 8,640,113 B2 * | 1/2014 | Silvera | G06F 9/4425 717/132 |
| 8,713,547 B2 | 4/2014 | Gschwind et al. | |
| 2002/0087949 A1 * | 7/2002 | Golender et al. | G06F 9/453 717/124 |
| 2007/0022428 A1 * | 1/2007 | Yamasaki | G06F 9/3009 718/108 |
| 2010/0217945 A1 | 8/2010 | Ge et al. | |
| 2014/0068573 A1 | 3/2014 | Brewis et al. | |

OTHER PUBLICATIONS

O'Donell, Carlos; Distributions still suffering from s390 ABI change problems; https://sourceware.org/ml/libc-alpha/2014-07/msg00316.html.
Jarno, Aurelien; Distributions still suffering from s390 ABI change problems; https://sourceware.org/ml/libc-alpha/2014-07/msg00318.html; Jul. 14, 2014.

(Continued)

*Primary Examiner* — Wei Y Zhen
*Assistant Examiner* — Mohammed N Huda
(74) *Attorney, Agent, or Firm* — Womble Bond Dickinson (US) LLP; Daniel E. Ovanezian

(57) ABSTRACT

A method for modifying a context saving function is disclosed. The method identifies a context saving function within a code fragment. The method further modifies the context saving function to determine a size of a register save buffer, allocate the register save buffer using the determined size, and save a register value in the register save buffer.

15 Claims, 6 Drawing Sheets

(56) References Cited

OTHER PUBLICATIONS

Miller, David; Distributions still suffering from s390 ABI change problems; https://sourceware.org/ml/libc-alpha/2014-07/msg00320.html; Jul. 14, 2014.

Felker, Rich; Distributions still suffering from s390 ABI change problems; https://sourceware.org/ml/libc-alpha/2014-07/msg00329.html; Jul. 15, 2014.

"SPU Application Binary Interface Specification", Cell Broadband Engine Architecture Joint Software Reference Environment Series, Jul. 18, 2008, 35 pages, Version 1.9, New York.

Oehmke, D. W., "Virtualizing Register Context", doctoral dissertation, The University of Michigan, 2005, 239 pages, Michigan, US.

"32-bit PowerPC Function Calling Conventions", OS X ABI Function Call Guide, Nov. 17, 2010, 19 pages, Apple Inc., downloaded from https://developer.apple.com/library/mac/documentation/DeveloperTools/Conceptual/LowLevelABI/100-32-bit_PowerPC_Function_Calling_Conventions/32bitPowerPC.html on Jun. 3, 2016.

* cited by examiner

MODIFICATION OF CONTEXT SAVING FUNCTIONS

TECHNICAL FIELD

This disclosure is related generally to computer systems, and more particularly, to context saving functions executable by computer systems.

BACKGROUND

Context saving herein refers to storing a software process state at a given process point so that the process state may be restored and resumed at the same process point at a later time. Context saving may be implemented in software code through the use of context saving functions.

BRIEF DESCRIPTION OF THE DRAWINGS

The disclosure may be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Figure 1:
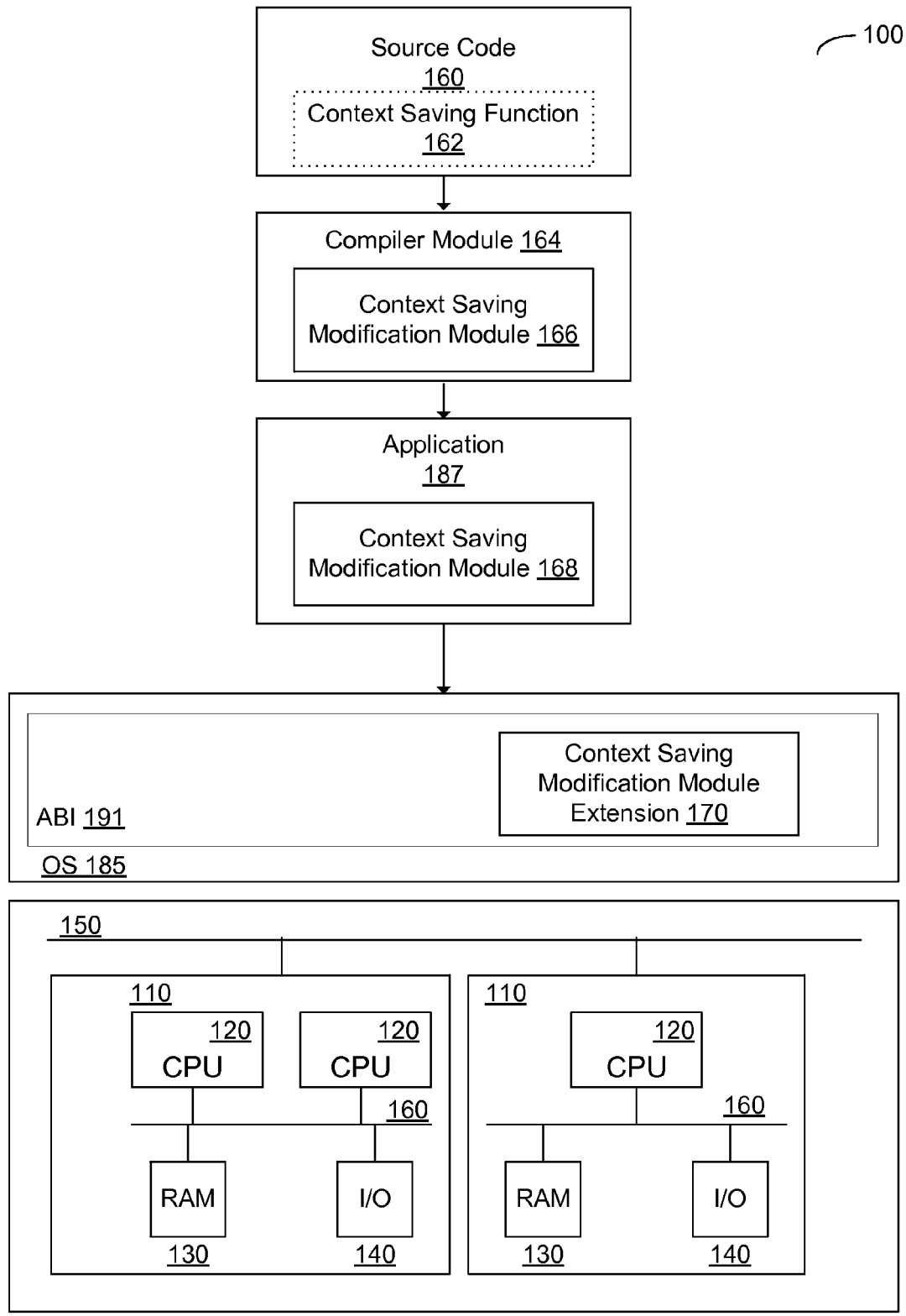
FIG. 1 is a block diagram of an example computer system architecture, in accordance with one or more aspects of the present disclosure.

A method and apparatus for modifying a context saving function is described. Software libraries, such as the GNU C library, provide various context switching functions, such as setjmp/longjmp and getcontext/setcontext that implement non-local control flow. Non-local control flow may be performed in certain situations, such as exception handling and the implementation of co-routines, where a software program jumps across one or more levels of function activations without using the normal call or return operations. Context switching functions may come in pairs, the initial part (e.g., setjmp) to save the process or thread state and the final part (e.g., longjmp) to restore the process or thread state at a later time. A context saving function may be a function that calls a context switching function. A fixed-sized variable of a certain type, for example jmp_buf, may be used with context saving functions to define a fixed-size register save buffer (i.e., memory space) to store the process or thread state. When central processing unit (CPU) architectures are modified, new CPU registers may be added. However, the fixed-size memory spaces used in conjunction with context switching functions cannot be easily modified and may be inadequately sized to store the contents of the full set of CPU registers upon execution of context saving functions. Additionally, the new CPU registers may have to be caller-saved, and may not be callee-saved, which may have a negative performance impact.

In one example, a computer system implementing the method may cause a compiler to modify or perform a post-process operation that modifies a context saving function so that the context saving function allocates, at runtime, register save buffers required to store the process state when executing a context saving function. A context saving function may be a function that calls a context switching function, such as a function that calls setjmp or longjmp. The method may be implemented by at least a compiler that compiles source code containing a context saving function or implemented by an application that contains executable code containing a context saving function. The method identifies a context saving function within a code fragment. For example, a compiler may identify a context saving function by recognizing the setjmp in the source code of an application. The method further causes a compiler to modify or performs a post-process operation to modify the context saving function to determine, at runtime, a size of a register save buffer, allocate the register save buffer using the determined size, and save a register value in the register save buffer. For example, the compiler may insert a function call into the context saving function to obtain the size of a register save buffer at runtime, and allocate the register save buffer using the size. The context saving function may also be modified to invoke a call (e.g., a system call or a function call) to the application binary interface (ABI) to save the process or thread state data to the register save buffer. Additionally, the context saving function may be modified to invoke another call (e.g., system call or a function call) to the ABI that restores the process or thread state data from the register save buffer to the CPU registers.

In another example, a computer system implementing the method may execute a modified context saving function to determine the size of the register save buffer at runtime. The method may also allocate the register save buffer using the determined size and save a register value in the register save buffer. The method may be implemented by at least an operating system implementing an ABI extension that receives calls from an application executing a modified context saving function or implemented by an application making calls to an operating system implementing an ABI extension, where the application includes a modified context saving function in executable code.

FIG. 1 is a block diagram of an example computer system architecture, in accordance with one or more aspects of the present disclosure. The computer system 100 may include source code 160, compiler 164, and application 187. Source code 160 may be a collection of computer instructions written using a programming language, such as but not limited to, C++, Java, C#, etc. Source code 160 may be used by a developer to specify actions to be performed by computer system 100. The source code 160 may use object-oriented programming. The source code 160 may contain one or more context saving functions, illustrated by context saving function 162.

In one example, context saving may be implemented in software code through the use of context saving functions, such as context saving function 162, that call a context switching function. A process (also referred to as a task) may be an executing instance of an application. In Linux, threads are lightweight processes that can run in parallel and share an address space (i.e., a range of memory locations) and other resources with the processes that created them (i.e., parent processes). A process state may comprise the contents of the CPU registers, such as the program counter, at a point in time. In an illustrative example, context saving function 162 may be described as a function that calls a context switching function, the context switching function that when executed cause a kernel (or user space) to perform one or more of the following activities with regard to processes on the CPU: suspend the progress of a process, store the process state in a register save buffer (e.g., memory, memory space, or memory location), after executing other processes, retrieve the process state data of the stored process state from the register save buffer and restore the process state (e.g., into the CPU registers), and return to the location indicated by the program counter (i.e., returning to the instruction of code at which the process was interrupted) in order to resume the process. In the case of the context switching function, setjmp, the suspension of the progress of a process may be achieved by returning twice, once after saving the process state, and once after returning to the location (i.e., after a call to longjmp).

In one example, the compiler module 164 may be an application (e.g., a software module, a program, etc.) and/or a set of applications that may transform the source code 160 (written in a programming language such as C++) into executable code, such as one or more executable binary files. Compiler module 164 may transform the context saving function 162 of source code 160 into executable code of application 187. An example of a compiler module may include, but is not limited to, a compiler from the GNU Compiler Collection (GCC). The compiler module 164 may generate the application 187 during an application generation process. For example, the compiler module 164 may build or generate application 187 from the source code 160 during the application generation process. Compiler module 164 may generate the application 187 containing context saving function 162 as executable code. Although the application 187 is described in the disclosure, in other embodiments, the compiler module 164 may generate a library (e.g., a collection of software modules) based on the source code 160. The compiler module 164 may receive a request to generate the application 187 from the source code 160. For example, the compiler module 164 may be invoked or instructed to compile the application 187 using a command or a request provided by a user (e.g., a programmer). In one embodiment, the command or request may be provided using a command line interface (e.g., a user interface that allows users to provide text commands) of a computing device. In another embodiment, the command or request may be user input (e.g., keyboard input of text, mouse or pointer input to click buttons or select options, etc.) provided by a graphical user interface of the compiler module 164 or the computing device.

In one example, context saving modification module 166 executed by compiler module 164 may identify a context saving function within a code fragment. A code fragment may be a part of source code 160. Context saving modification module 166 may also cause the compiler to modify the context saving function 162. Context saving modification module 168 executed by application 187 may also identify a context saving function within a code fragment. A code fragment may be part of the executable code of application 187. Context saving modification module 168 may intercept, at runtime, context saving function 162 and modify the executable code prior to the code being executed. Context saving modification module 166 and 168 will be discussed in more detail with respect to FIG. 2.

The computer system 100 may include one or more interconnected nodes 110. "Node" herein shall refer to a group of one or more processing devices and one or more associated memory devices locally accessible by the processing devices in the group. Each node 110 may in turn include one or more physical processing devices 120 communicatively coupled to memory devices 130 and input/output (I/O) devices 140.

"Physical processing device" or "processing device" herein shall refer to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processing device may be a single core processor which is typically capable of executing one instruction at a time (or process a single pipeline of instructions), or a multi-core processor which may simultaneously execute multiple instructions. In another aspect, a processing device may be implemented as a single integrated circuit, two or more integrated circuits, or may be a component of a multi-chip module (e.g., in which individual microprocessor dies are included in a single integrated circuit package and hence share a single socket). A processing device may also be referred to as a central processing unit (CPU).

"Memory device" herein shall refer to a volatile or non-volatile memory device, such as RAM, ROM, EEPROM, or any other device capable of storing data. "I/O device" herein shall refer to a device capable of providing an interface between one or more processor pins and an external device capable of inputting and/or outputting binary data.

"Register save buffer" herein shall refer to a memory used to store contents of CPU registers, e.g., in conjunction with the execution of a context saving function. A register save buffer may be used when performing task (e.g., process or thread) switching within a computer system. Register save buffers may be implemented in a fixed memory location in hardware, or by using a virtual data buffer in software, pointing to a location in physical memory. In both cases, data stored in a register save buffer may be stored on a physical storage medium such as memory device 130, registers of processing device 120, or hard disk drives (not shown).

Processing device 120 may be interconnected using a variety of techniques, ranging from a point-to-point processor interconnect, to a system area network 150, as shown in FIG. 1. Local connections within each node 110, including the connections between processing device 120 and a memory device 130 and between processing device 120 and an I/O device 140 may be provided by one or more local buses 160 of suitable architecture, for example, peripheral component interconnect (PCI). One or more applications 187 may be executed by the computer system 100 with an operating system 185.

In certain implementations, computer system 100 may implement an application binary interface (ABI) 191 defining a system call interface allowing user space programs, such as application 187, to execute kernel-level functions of the operating system 185. In certain implementations, the processing devices 120 may be provided by 64-bit processors, and hence the computer system 100 may implement a 64-bit ABI. In certain implementations, the computer system 100 may additionally implement a 32-bit ABI affording certain user space programs numerous benefits of the 64-bit processor architecture (e.g., larger number of processor registers, better floating-point performance, etc.) while using 32-bit pointers and thus avoiding the overhead of 64-bit pointers and decreasing the memory footprint of a running user space program.

ABI 191 may define how a user space program, such as application 187, may interact with the underlying operating system 185 or another program. Numerous system calls are typically available to the user space program via ABI 191 implemented by computer system 100. An ABI may include, e.g., requirements to sizes, layout, and alignment of data types; procedure calling conventions; and/or binary formats of object, executable and library files. ABI 191 may also define a system call interface allowing a user space program invoke operating system functions. A system call may provide a way for an application to request a service from a kernel of operating system 185. A system call may be an ABI function. In other implementations, an ABI 191 may not be restricted to the kernel. ABI 191 may be used in any element that provides an interface for executing code which is not available in source form (e.g., executing an artifact which has been the result of some compilation and/or linking process). Depending on the particular context saving function, the process or thread may be saved entirely in user space, and a switch to kernel mode may not be necessary. Accordingly, ABI 191 may also define a call interface allowing a user space program to invoke user space functions. A call, such as a function call, may provide a way for an application to request a user space function associated with context saving function and/or a context switching function. It should be noted that systems calls, as referenced in the present application, may also be implemented as calls, such as function calls, to ABI 191.

In certain implementations, ABI 191 may include context saving modification module extension 170. Context saving modification module extension 170 may comprise system calls (e.g., ABI functions) for a context saving function 162 modified by a compiler executing context saving modification module 166. Additionally, context saving modification module extension 170 may comprise systems calls for a context saving function modified by a post-processing operation after compilation caused by context saving modification module 168. For example, a modified context saving function 162 when executed may make system calls via context saving modification module extension 170 to determine a size of a register save buffer, allocate the register save buffer using the determined size, and save a register value in the register save buffer. Context saving modification module extension 170 may also be implemented by application 187. Application 187 may make system calls defined by ABI 191 to OS 185 to determine a size of a register save buffer, allocate the register save buffer using the determined size, and save a register value in the register save buffer. Context saving modification module extension 170 will be further described with respect to FIG. 4.

Figure 2:
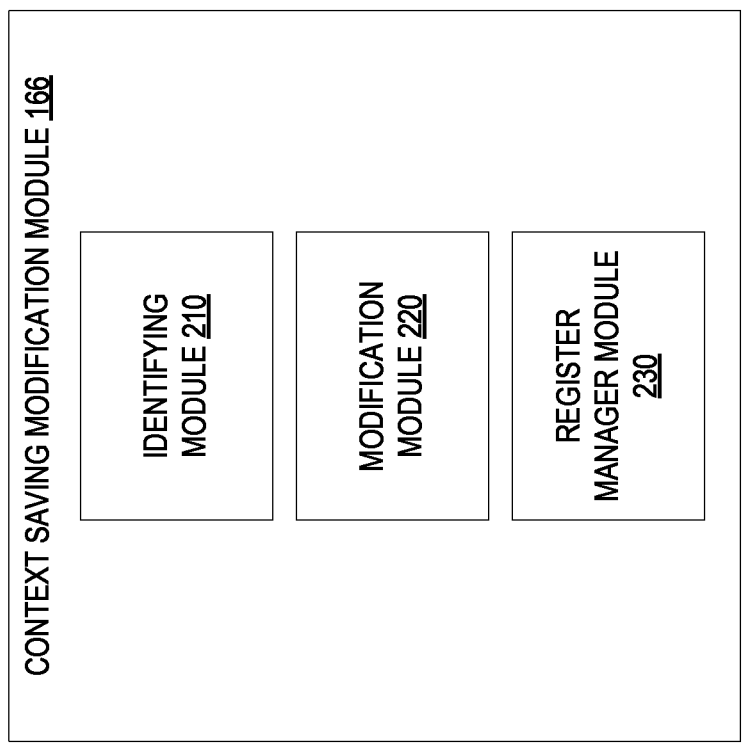
FIG. 2 is a block diagram illustrating an example context saving modification module.

FIG. 2 is a block diagram illustrating an example context saving modification module. Context saving modification module 166 includes identifying module 210, modification module 220, and register manager module 230. The various modules included in context saving modification module 166 help implement the various features of context saving modification module 166. Context saving modification module 168 may be considered to perform similar actions and include similar features as described in regards to context saving modification module 166, unless noted otherwise. In particular, context saving modification module 166 may cause a compiler to modify source code containing the context saving function 162. Context saving modification module 168 may modify the context saving function 162 by causing a post-processing operation to be performed on the executable code after compilation. All of part of context saving modification module 166 may be implemented by one or more of compiler 164 or application 187.

Identifying module 210 identifies a context saving function within a code fragment. A code fragment may be part of source code 160 written in a programming language or executable code of application 187. Identifying a context saving function may include identifying an attribute of the code fragment indicating that the code fragment includes a context saving function. An attribute indicates that a code fragment contains at least part of a context saving function and/or context switching function. An attribute may comprise a keyword, a function call, a function name, and/or a variable in source code or the effective binary equivalent in executable code. For instance, identifying module 210 may identify the function name "setjmp" or "sigsetjmp" in a source code file which indicates that the source code contains a context saving function. Alternatively, identifying module 210 may identify the binary encoding of a setjmp function or sigsetjmp function in the executable code of application 187, which indicates that the executable code contains a context saving function. Identifying module 210 may keep a record of attributes that identify a context saving function. The record may be stored in any memory location such as memory device 130 or a data store (note shown) and may be updated through an I/O interface such as I/O 140. In another implementation, identifying module 210 may identify a context saving function within a code fragment by operating directly on compiler-internal data structures. For example, a code fragment may be transformed into one or more internal data structures by compiler module 164. Identifying module 210 may operate on an intermediate representation of compiler module 164, such as an expression tree, an abstract syntax tree (AST), a basic block in a static single assignment (SSA) form, in a continuation-passing style (CPS), or in a register transfer language (RTL). Identifying module 210 may examine a "call" node in the internal data structures, and recognize a call to a context switching function. In another implementation, compiler module 164 may produce a dedicated node for context switching functions, and identifying module 210 may recognize a dedicated node.

Modification module 220 may cause the context saving function identified by identifying module 220 to be modified. Modification module 220, when executed by context saving module 166, may cause compiler module 164 to modify the source code of context saving function 162 prior to compilation. In another implementation, modification module 220 may operate directly on compiler-internal data structures. For example, modification module 220 may cause compiler module 164 to transform the internal data structures associated with the context saving function to determine a size of a register save buffer. A register save buffer may be a memory location that temporarily stores a register value in conjunction with the execution of a context saving function (or context switching function). The register value may be comprised by a process state. The register save buffer may be an additional register save buffer distinct from a fixed-size register save buffer (e.g., platform-specific data structure) associated with the context switching function. For example, a context saving function may use a fixed size variable of a certain type (e.g., jmp_buf) to indicate that a fixed-size register save buffer may be to be used in conjunction with a context saving function. An additional register save buffer may be needed in addition to the fixed-size register save buffer allocated by the variable of jmp_buf type. The register save buffer may be an additional register save buffer that is distinct from the fixed-size register save buffer. In another example, the register save buffer may include the fixed-size register buffer and any additional register save buffers required to store the register value.

In another example, modification module 220, when executed by context saving module 168, may modify context saving function 162 by performing a post-processing operation following compilation. For example, context saving module 168 may intercept context saving function 162 prior to the function call being executed. Since the context saving function 162 may be compiled, modification module 220 may intercept a function call defined by executable code. As stated above, modification module 220 may intercept a function call in executable code in a similar manner as identifying module 210 identifies a context saving function within a code fragment. For example, modification module 220 may identify and intercept an attribute that indicates that a code fragment contains at least part of a context saving function. The code fragment may be executable code which is intercepted prior to execution.

In another example, modification module 220 may cause a compiler to or perform a post-process operation to insert a function call into the context saving function in order to determine, at runtime, the size of the register save buffer. The function call may be inserted into source code 160 or executable code of application 187. The function call may be a system call defined by context saving modification module extension 170 of ABI 191. The function call may request an indication of the size. The indication may be a memory location where the size is stored or be the actual size of the register save buffer. Alternatively, modification module 220 may retrieve a value of a variable, such as global variable, that contains the size of the register save buffer.

Modification module 220 may cause a compiler to modify or perform a post-processing operation to modify a context saving function to allocate the register save buffer using the runtime determined size. In one example, modification module 220 causes a compiler to modify or performs a post-processing operation to modify an initial part of the context switch to allocate the register save buffer. An initial part of the context switch may be an initial part of a context switching function (e.g., prologue). An initial part of the context switch (e.g., setjmp) prepares a register save buffer memory space and saves the process state at a given time period while final part of the context switch (e.g., longjmp) restores the process state at a later time period. A final part of a context switch may be the final part of the context switching function (e.g., epilogue). Modification module 220 may use the determined size and insert a variable defining a register save buffer into the context saving function. The register save buffer may be sized for the determined size. In another example, the modification module 220 may causes a compiler to insert or performs a post-processing operation to insert another function call into the initial part of the context switch that allocates the register save buffer.

Modification module 220 may cause a compiler to modify or perform a post-processing operation to modify a context saving function to save a register save value in the register save buffer. In one example, modification module 220 causes a compiler to modify or performs a post-processing operation to modify an initial part of the context switching function to call a first system call to save process state to the register save buffer. The system call may be part context saving modification module extension 170 of ABI 190 and sent of OS 185. Modification module 220 may cause a compiler to insert or perform a post-processing operation to insert the system call to the context saving function 162. The process state may comprise a CPU state.

Modification module 220 may cause a compiler to modify or perform a post-processing operation to modify the context saving function by modifying the final part of the context switch to call another system call to restore the process state from the register save buffer. The system call may be part of context saving modification module extension 170 of ABI 191 and sent to OS 185 to be executed. Modification module 220 may cause a compiler to insert or perform a post-processing operation to insert the system call into the context saving function 162.

Modification module 220 may provide an indication of the context saving function having been modified. An indication may include referencing a symbol in the compiled source code 160 or executable code of application 187 indicating that the code has been modified by context saving modification module 166 or 168. For example, the compiled source code 160 or executable code of application 187 may have a different name or symbol version. Additionally, an indication may be embedded into the compiled source code 160 or executable code of application 187 indicating that the context saving function call 162 has been modified.

Register manager module 230 may manage the context saving function so that register values originally stored in the register save buffer may be saved and restored after the execution of the context saving function. For example, prior to allocating the register save buffer associated with a context saving function, the register save buffer may contain original register values. The original register values may be saved prior to the execution the initial part of the context switch and restored after the final part of the context switch. Register manager module 230 may save the original register values by for example, spilling the original register values onto the stack, re-computing the original register values, or copying the original register values to another register. The original register values may be restored to the register save buffer after the execution of the final part of the context switch. Register manager module 230 may modify the context saving function so that the original register values may be saved and restored. For example, register manager module 230 may modify the context saving function to move the original register value to a new memory location. The register manager module 230 may also modify the context saving function to restore the original register value back to its original register save buffer location after the final part of the context switch. Register manger module may modify the context saving function by inserting one or more additional code fragments or functions to execute the above modifications.

Figure 3:
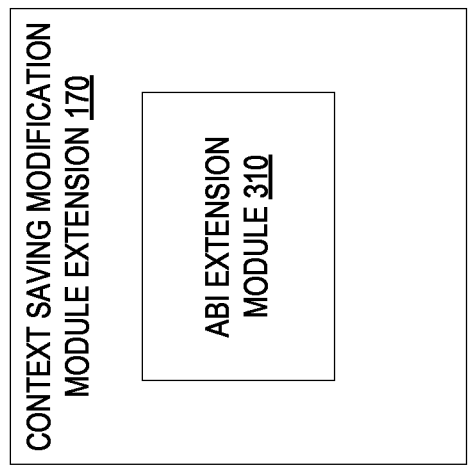
FIG. 3 is a block diagram illustrating an example context saving modification module extension.

FIG. 3 is a block diagram illustrating an example context saving modification module extension. Context saving modification module extension 170 includes ABI extension module 310. All or part of context saving modification module extension 170 may be implemented or used by any one or more of operating system 185, ABI 191, compiler module 164, or application 187. In one example, ABI 191 includes context saving modification module extension 170, and context saving modification module extension 170 defines system calls included in a modified context saving function as described herein.

Context saving modification module extension 170 may be an ABI extension to ABI 191 that includes a definition of one or more system calls that returns the register buffer size at runtime or a definition of a global variable that stores the buffer size. In one example, application 187 sends a function, such as a system call, to OS 185 to determine the size of a register save buffer. The system call may be defined by ABI extension module 310 of context saving modification module extension 170.

ABI extension module 310 may define a system call that allocates the register save buffer using the determined size. In one example, application 187 sends a function, such as a system call, to OS 185 to allocate the register save buffer. The system call may be defined by ABI extension module 310. OS 185 may allocate the register save buffer in response to the system call.

ABI extension module 310 may define a system call that saves a register value in the register save buffer. In one example, the register save value may be process state data such as CPU state data. In one example, application 187 sends a function, such as a system call, to save a register value in the register save buffer by sending the function to OS 185. The system call may be defined by ABI extension module 310. OS 185 may save the register value to the register save buffer in response to the system call. It should be noted that one or more of determining the size of a register save buffer, allocating the register save buffer, or saving a register value in the register save buffer may be implemented by one or more calls, such a system call or function call.

ABI extension module 310 may define a system call that restores a register value using the register save buffer. In one example, the system call may restore process state such as CPU state from register values stored in the register save buffer. In one example, application 187 sends a function, such as a system call, to OS 185 to restore a register value using the register save buffer. The system call may be defined by ABI extension module 310. OS 185 may restore the process state to the CPU in response to the system call.

Figure 4:
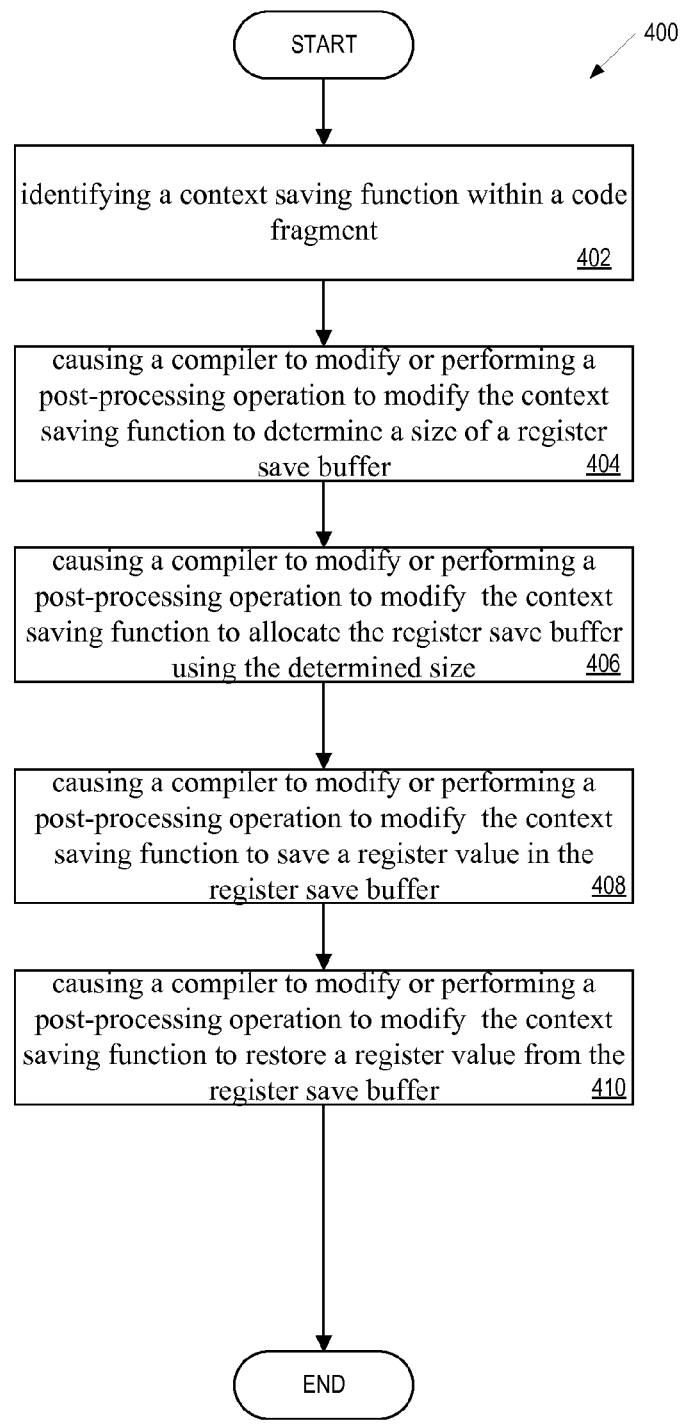
FIG. 4 depicts a flow diagram of an example method for causing a compiler to modify or performing a post-processing operation to modify a context saving function, according to an implementation of the disclosure.

FIG. 4 depicts a flow diagram of an example method 400 for causing a compiler to modify or performing a post-processing operation to modify a context saving function, according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one implementation, method 400 may be performed by computer system 100 of FIG. 1. In another implementation, method 400 may be performed or caused to be performed by context saving modification module 166 or context saving modification module 168 (not shown) of FIG. 2. For simplicity of explanation, method 400 is depicted and described as a series of acts. However, acts in accordance with this disclosure can occur in various orders, concurrently, and/or with other acts not presented or described herein. Furthermore, not all illustrated acts may be required to implement method 400 in accordance with the disclosed subject matter. In addition, those skilled in the art will understand and appreciate that method 400 may alternatively be represented as a series of interrelated states via a state diagram or interrelated events.

Method 400 begins at block 402 where the processing logic implementing the method identifies a context saving function within a code fragment. In one example, identifying the context saving function includes identifying an attribute of the code fragment indicating that the code fragment includes the context saving function and/or a context switching function. A code fragment may be at least part of source code 160, compiler-internal data structures, or executable code of application 187. Additional details of block 402 are described in regards to FIG. 1 and FIG. 2.

Method 400 continues at block 404 where the processing logic causes a compiler to modify or performs a post-processing operation to modify the context saving function to determine a size of the register save buffer. In one example, processing logic causes a compiler to modify or performs a post-processing operation to modify the context saving function by inserting another function call into the context saving function, the function call to receive an indication of the size of the register save buffer. In another example, the register save buffer may be an additional register save buffer distinct from a fixed-size register save buffer associated with the context saving function. Additional details of block 404 are described in regards to FIG. 1 and FIG. 2.

Method 400 continues at block 406 where the processing logic causes a compiler to modify or performs a post-processing operation to modify the context saving function to allocate the register save buffer using the determined size. In one example, processing logic causes a compiler to modify or performs a post-processing operation to modify an initial part of the context switch to allocate the register save buffer. Additional details of block 406 are described in regards to FIG. 1 and FIG. 2.

Method 400 continues at block 408 where the processing logic causes a compiler to modify or performs a post-processing operation to modify the context saving function to save a register value in the register save buffer. In one example, processing logic causes a compiler to modify or performs a post-processing operation to modify the initial part of the context switch to call system call to save process state data to the register save buffer. Additional details of block 408 are described in regards to FIG. 1 and FIG. 2.

Method 400 continues at block 410 where the processing logic causes a compiler to modify or performs a post-processing operation to modify the context saving function to restore a register value from the register save buffer. In one example, processing logic causes a compiler to modify or performs a post-processing operation to modify the final part of the context switch to call a system call to restore process state data from the register save buffer. Additional details of block 410 are described in regards to FIG. 1 and FIG. 2.

Figure 5:
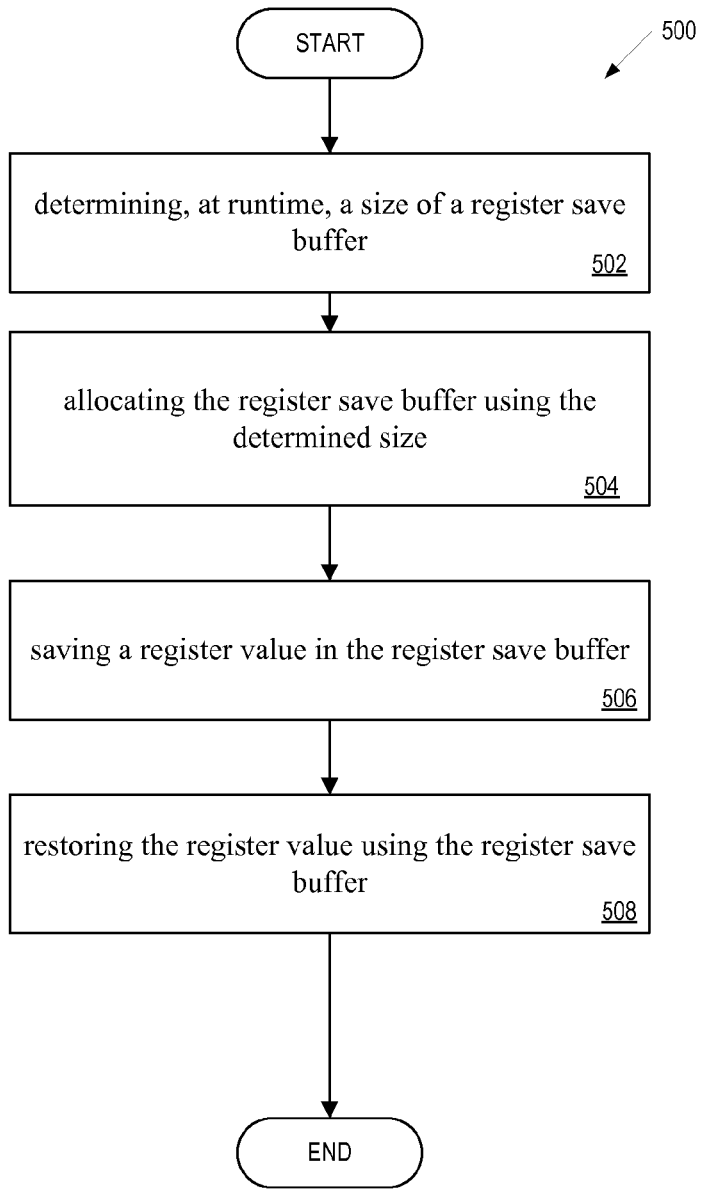
FIG. 5 depicts a flow diagram of an example method for executing a context saving function, according to an implementation of the disclosure.

FIG. 5 depicts a flow diagram of an example method 500 for executing a context saving function, according to an implementation of the disclosure. Method 500 may be performed by processing logic that may comprise hardware (e.g., circuitry, dedicated logic, programmable logic, microcode, etc.), software (such as instructions run on a processing device), firmware, or a combination thereof. In one implementation, method 500 may be performed by computer system 100 of FIG. 1. In another implementation, method 500 may be performed by context saving modification module 168 alone or in conjunction with context saving modification module extension 170 of FIG. 3. For simplicity of explanation method 500 is depicted and described as a series of acts. However, acts in accordance with this disclosure can occur in various orders, concurrently, and/or with other acts not presented or described herein. Furthermore, not all illustrated acts may be required to implement method 500 in accordance with the disclosed subject matter. In addition, those skilled in the art will understand and appreciate that method 500 may alternatively be represented as a series of interrelated states via a state diagram or interrelated events.

Method 500 begins at block 502 where the processing logic implementing the method sends a system call to OS 185 that when executed determines, at runtime, a size of register save buffer. The system call may be defined by context saving modification module extension 170. At block 504, processing logic sends a system call to OS 185 that when executed allocates the register save buffer using the determined size. The system call may be defined by context saving modification module extension 170. At block 506, processing logic sends a system call to OS 185 that when executed saves a register value in the register save buffer. The system call may be defined by context saving modification module extension 170. In one example, the register value includes process state data. It should be noted that after saving in block 506, processing logic may perform additional actions. For example, computations associated with the context saving function may be performed. Additionally, the additional function calls may be performed after saving the register value in the register save buffer but before restoring the register value. At block 508, processing logic sends a system call to OS 185 that when executed restores the register value using the register save buffer. The system call may be defined by context saving modification module extension 170. Additional details of method 500 and the associated blocks are described in regards to FIG. 1 and FIG. 3.

Figure 6:
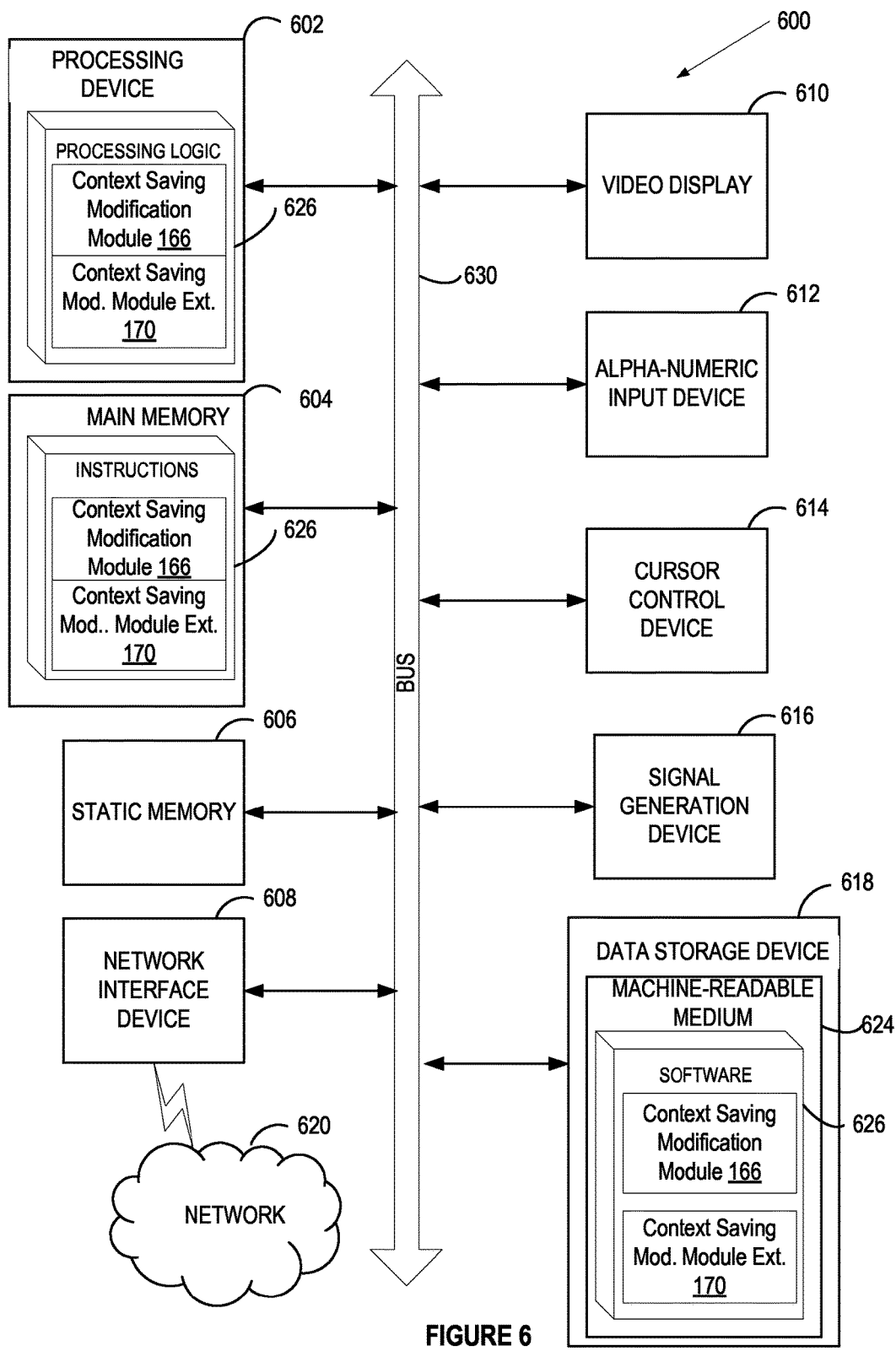
FIG. 6 illustrates a block diagram of one implementation of a computer system.

FIG. 6 illustrates a block diagram of one implementation of a computer system. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 600 includes a processing device 602, a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 may be configured to execute the processing logic 626 for performing the operations and steps discussed herein.

The computer system 600 may further include a network interface device 608 communicably coupled to a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 624 on which may be stored software 626 embodying any one or more of the methodologies of functions described herein. The software 626 may also reside, completely or at least partially, within the main memory 604 as instructions 626 and/or within the processing device 602 as processing logic 626 during execution thereof by the computer system 600; the main memory 604 and the processing device 602 also constituting machine-accessible storage media.

The machine-readable storage medium 624 may also be used to store instructions 626 to implement the context saving modification module 166, context saving modification module 168 (not shown), and context saving modification module extension 170 to implement any one or more of the methodologies of functions described herein in a computer system, such as the computer system described with respect to FIG. 1, and/or a software library containing methods that call the above applications.

While the machine-accessible storage medium 624 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that may be capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It may be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying", "modifying", "inserting", "providing", "determining", "allocating", "saving", "restoring", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems may appear as set forth in the description below. In addition, the disclosure is not described with reference to any particular programming language. It may be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure may no doubt become apparent to a person of ordinary skill in the art after having read the foregoing description, it is to be understood that any particular example shown and described by way of illustration is in no way intended to be considered limiting. Therefore, references to details of various examples are not intended to limit the scope of the claims, which in themselves recite only those features regarded as the disclosure.

What is claimed is:

1. A method comprising:
   identifying a context saving function within a code fragment; and
   modifying, by a processing device, a portion of the code fragment corresponding to the context saving function to generate a modified context saving function to:
   determine a size of a register save buffer where a register value indicative of a process state of a processing unit is stored in the register save buffer responsive to an execution of the context saving function;
   allocate the register save buffer using the determined size;
   save the register value in the register save buffer, wherein the register value is to restore the process state of the processing unit; and
   provide an indication of the context saving function having been modified,
   wherein the modified context saving function allows the context saving function associated with a fixed-size register save buffer used by a first processing architecture of the processing unit to be used by a second processing architecture that uses one or more additional processing unit registers.

2. The method of claim 1, wherein modifying the context saving function further comprises:
   inserting a function call to receive an indication of the size of the register save buffer.

3. The method of claim 1, wherein modifying the context saving function further comprises:
   modifying an initial part of a context switch to:
   allocate the register save buffer; and
   call a first system call to save process state data to the register save buffer.

4. The method of claim 1, wherein modifying the context saving function further comprises:
   modifying a final part of a context switch to:
   call a second system call to restore the process state data from the register save buffer.

5. The method of claim 1, wherein the register save buffer is an additional register save buffer distinct from the fixed-size register save buffer associated with the context switching function, and wherein the processing device is the same as the processing unit.

6. The method of claim 1, wherein identifying the context saving function within a code fragment further comprises:
   identifying an attribute of the code fragment indicating that the code fragment comprises a context switching function.

7. The method of claim 1, wherein the code fragment comprises at least one of a source code, compiler-internal data structure, or an executable code.

8. The method of claim 1, wherein modifying the context saving function is performed by a compiler.

9. The method of claim 1, wherein modifying the context saving function is performed as a post-processing operation following a compilation.

10. A system comprising:
    a memory; and
    a processing device, operatively coupled with the memory, to:
    identify a context saving function within a code fragment; and
    modify a portion of the code fragment corresponding to the context saving function to generate a modified context saving function to:
    determine a size of a register save buffer where a register value indicative of a process state of a processing unit is stored in the register save buffer responsive to an execution of the context saving function;
    allocate the register save buffer using the determined size;
    save the register value in the register save buffer, wherein the register value is to restore the process state of the processing unit; and
    provide an indication of the context saving function having been modified, wherein the modified context saving function allows the context saving function associated with a fixed-size register save buffer used by a first processing architecture of the processing unit to be used by a second processing architecture that uses one or more additional processing unit registers.

11. The system of claim 10, wherein the processing device is further to:
insert a function call to determine the size of the register save buffer.

12. The system of claim 10, wherein the processing device is further to:
modify an initial part of a context switch to:
allocate the register save buffer; and
call a first system call to save process state data to the register save buffer.

13. The system of claim 10, wherein the processing device is further to:
modify a final part of a context switch to:
call a second system call to restore the process state data from the register save buffer.

14. A non-transitory computer readable storage medium including instructions that, when executed by a processing device, cause the processing device to:
identify a context saving function within a code fragment; and
modify, by the processing device, a portion of the code fragment corresponding to the context saving function to generate a modified context saving function to:
determine a size of a register save buffer where a register value of a process state of a processing unit is stored in the register save buffer responsive to an execution of the context saving function;
allocate the register save buffer using the determined size;
save the register value in the register save buffer, wherein the register value is to restore the process state of the processing unit; and
provide an indication of the context saving function having been modified,
wherein the modified context saving function allows the context saving function associated with a fixed-size register save buffer used by a first processing architecture of the processing unit to be used by a second processing architecture that uses one or more additional processing unit registers.

15. The non-transitory computer readable storage medium of claim 14, wherein to modify the context saving function, the processing device is to:
insert a function call to receive the size of the register save buffer;
modify an initial part of a context switch to:
allocate the register save buffer; and
call a first system call to save process state data to the register save buffer; and modify a final part of a context switch to:
call a second system call to restore the process state data from the register save buffer.

* * * * *